United States Patent
Pater et al.

(10) Patent No.: US 11,912,472 B2
(45) Date of Patent: Feb. 27, 2024

(54) SELF-CLOSING DISPENSING VALVE MADE OF A PLASTOMER OR A THERMOPLASTIC ELASTOMER

(71) Applicant: Weener Plastics Group B.V., Ede (NL)

(72) Inventors: Marcel Pater, Doorn (NL); Alwin Mertens, Apeldoorn (NL); Sebastiaan Wilhelmus Josephus Den Boer, Twello (NL); Lenny Marita Ellenkamp-Van Olst, Doetinchem (NL)

(73) Assignee: Weener Plastics Group B.V., Ede (NL)

( * ) Notice: Subject to any disclaimer, the term of this patent is extended or adjusted under 35 U.S.C. 154(b) by 84 days.

(21) Appl. No.: 17/438,611

(22) PCT Filed: Mar. 17, 2020

(86) PCT No.: PCT/NL2020/050176
§ 371 (c)(1),
(2) Date: Sep. 13, 2021

(87) PCT Pub. No.: WO2020/190133
PCT Pub. Date: Sep. 24, 2020

(65) Prior Publication Data
US 2022/0135290 A1      May 5, 2022

(30) Foreign Application Priority Data
Mar. 19, 2019   (NL) ..................... 2022764

(51) Int. Cl.
*B65D 47/20* (2006.01)
*B65D 47/08* (2006.01)
*F16K 15/14* (2006.01)

(52) U.S. Cl.
CPC ..... *B65D 47/2031* (2013.01); *B65D 47/0838* (2013.01); *F16K 15/147* (2013.01)

(58) Field of Classification Search
CPC ............ B65D 47/2031; B65D 47/0838; F16K 15/147
(Continued)

(56) References Cited

U.S. PATENT DOCUMENTS

| | | | |
|---|---|---|---|
| 2,758,755 A | 8/1956 | Schafler | |
| 5,839,614 A * | 11/1998 | Brown | ............... B65D 47/2031 222/212 |

(Continued)

FOREIGN PATENT DOCUMENTS

| | | |
|---|---|---|
| EP | 1 005 430 B1 | 10/2002 |
| JP | H8-282703 A | 10/1996 |

(Continued)

OTHER PUBLICATIONS

International Application No. PCT/NL2020/050176, PCT Communication in Cases for Which No. Other Form is Applicable enclosing a Third Party Observation, Dec. 10, 2020, 6 pages.

(Continued)

*Primary Examiner* — Lien M Ngo
(74) *Attorney, Agent, or Firm* — Hoffmann & Baron, LLP

(57) ABSTRACT

A self-closing dispensing valve is made of an elastic material and includes a valve head with a dispensing orifice, a circular peripheral retaining flange spaced apart from the valve head in an axial direction, and a connector sleeve integrally connected with the valve head on one end and the retaining flange on another end. The elastic material is a plastomer or a thermoplastic elastomer. The connector sleeve is substantially form stable. The valve head is connected to an upper end of the connector sleeve by a hinge portion that is U-shaped in cross section. The wall thickness of the hinge portion is smaller than the wall thickness of the connector sleeve and is staggered at the transition between the connector sleeve and the hinge portion. Alternatively, if (Continued)

the connector sleeve is omitted, then the valve head is directly connected to the retaining flange.

20 Claims, 7 Drawing Sheets

(58) Field of Classification Search
USPC .............. 222/490, 491, 566, 511, 492–498
See application file for complete search history.

(56) References Cited

U.S. PATENT DOCUMENTS

| | | | |
|---|---|---|---|
| 6,062,436 A | 5/2000 | Fuchs | |
| 6,293,437 B1 | 9/2001 | Socier et al. | |
| 6,367,668 B1 | 4/2002 | Schwanenberg | |
| 6,616,016 B2 * | 9/2003 | Hicks | B65D 47/2031 222/212 |
| 6,726,063 B2 | 4/2004 | Stull et al. | |
| 6,749,092 B2 * | 6/2004 | Olechowski | B65D 47/24 222/525 |
| 7,077,296 B2 * | 7/2006 | Brown | B65D 47/2031 222/212 |
| 7,128,245 B2 * | 10/2006 | Lee | B65D 47/0809 222/562 |
| 7,699,193 B2 | 4/2010 | Feierabend | |
| 8,016,507 B2 | 9/2011 | Wright | |
| 8,397,956 B2 | 3/2013 | Olechowski | |
| 9,580,214 B2 | 2/2017 | Hatton et al. | |
| 2003/0106910 A1 | 6/2003 | Hicks et al. | |

FOREIGN PATENT DOCUMENTS

| | | |
|---|---|---|
| WO | 01/32552 A1 | 5/2001 |
| WO | 2008/074517 A2 | 6/2008 |
| WO | 2008/097306 A1 | 8/2008 |

OTHER PUBLICATIONS

Chinese Office Action, Application No. 202080023150.8, dated Nov. 30, 2022, 10 pages.

* cited by examiner

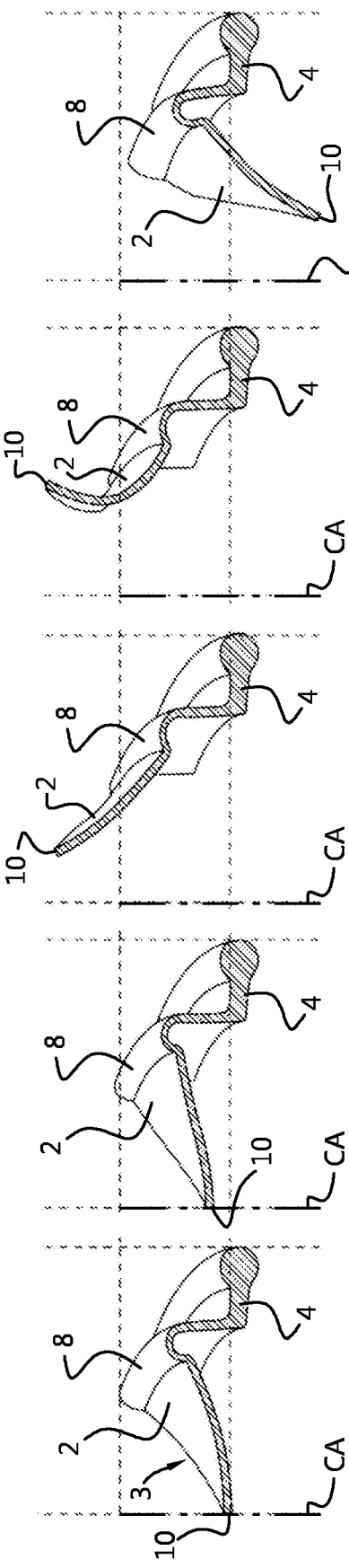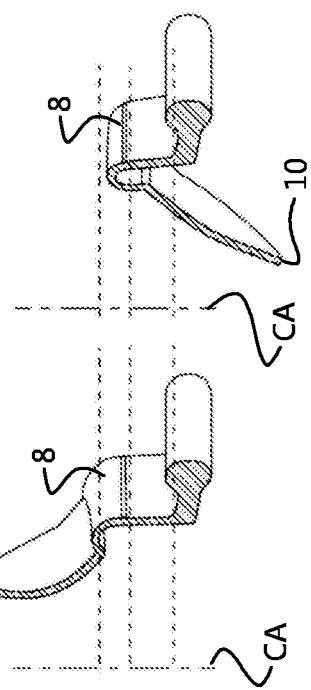

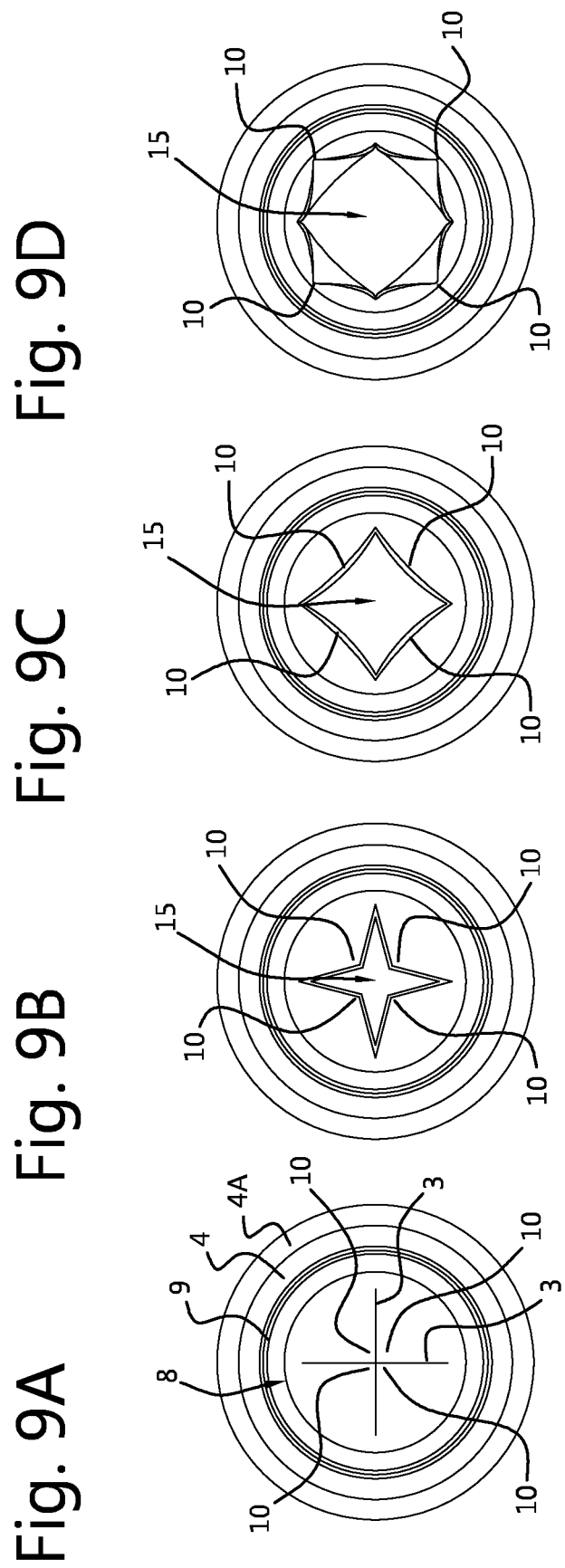

SELF-CLOSING DISPENSING VALVE MADE OF A PLASTOMER OR A THERMOPLASTIC ELASTOMER

CROSS-REFERENCE TO RELATED APPLICATIONS

This application is the National Stage of International Application No. PCT/NL2020/050176, filed Mar. 17, 2020, which claims the benefit of Netherlands Application No. 2022764, filed Mar. 19, 2019, the contents of which is incorporated by reference herein.

FIELD OF THE INVENTION

The invention relates to a self-closing dispensing valve made of an elastic material, said valve comprising a valve head with a dispensing orifice, a circular peripheral retaining flange spaced apart from the valve head in an axial direction, and a connector sleeve integrally connected with the valve head on one end and the retaining flange on another end.

BACKGROUND OF THE INVENTION

This type of self-closing valves is well known and is mounted commonly in dispensing closures to be arranged on a container containing a substance to be dispensed. Well known applications are for example dispensing closures for squeeze bottles such as ketchup, mayonnaise, honey bottles and container for other edible substances. Another example is dispensing closures for squeezable bottles for haircare, bodycare or cleaning products. When the container is squeezed and thus the interior is pressurized, the valve orifice opens and the substance can be dispensed through the valve. After the pressure on the container is relieved, the valve closes automatically due to the elasticity of the valve material.

An example of such a valve is shown in WO 2008/074517. FIGS. 3 to 5 of WO 2008/074517 show a self-closing valve integrally formed of silicone rubber by injection moulding. It has a valve head with a circular outer contour, a concave outer surface and a convex inner surface. The valve furthermore has a circular retaining flange at an axial distance from the valve head, by which the valve can be fixed to a dispensing closure. The axially offset valve head and retaining flange are connected by a connector sleeve which has substantially a cylindrical or a frusto-conical shape. The valve is placed and fixed to a dispensing closure which is adapted to be coupled to a container with a dispensible content such as foodstuffs, e.g. ketchup or other sauces, or such as cosmetic or care products. The valve head is provided with slits which form a dispensing orifice which opens upon pressurization of the container.

Although silicone rubber valves are very fit for their purpose they pose a problem after use, when the user throws away the container with the dispensing closure in which the valve is still fixed. The containers and the dispensing closure are usually made of a recyclable plastics material such as PET, PE or PP. However, the silicone material cannot be recycled and therefore disturbs the recycle streams of the containers and closures.

One way to circumvent the recycling problem is to separate the self-closing valves from the closures during recycling. In WO 2008/097306 a method is disclosed for flotation separation of silicone and plastic. The document describes as an example plastic bottles with a valve diaphragm made of cured silicones which can be separated by using a low-gravity silicone for the valves which allows the materials to be separated and the plastic can be recycled.

Another way to circumvent the recycling problem is to use another material for the self-closing valves. For example in U.S. Pat. No. 6,726,063 it is proposed to make the self-closing valve from a thermoplastic elastomer (TPE), which has the advantage that it can be processed and recycled like thermoplastic materials, which makes it is easier to recycle scrap because the TPE of the valves and the thermoplastic materials of the other package items, such as closures and containers does not have to be separated but can be processed together. U.S. Pat. No. 6,726,063 shows many valves with different slit shapes and positions in the valve head to enhance the control of dispensing through the valve head.

A disadvantage of TPE compared to silicone rubber for self-closing dispensing valves is that TPE grades having similar mechanical properties as the used silicone materials are often not suitable for use with different food products. In particular when used with fatty food products, the TPE grades which have similar mechanical properties as silicone materials show too much migration of agents into the food product. TPE grades which are suitable for use with fatty foods are typically stiff and cannot be used with known valve designs used in the food packaging industry.

The present invention has for an object to provide an improved self-closing dispensing valve, which is compatible with the dispensing of foodstuffs but avoids the use of silicone materials.

SUMMARY OF THE INVENTION

This object is achieved by a self-closing valve made of an elastic material, said valve comprising a valve head with a dispensing orifice, a circular peripheral retaining flange spaced apart from the valve head in an axial direction, and a connector sleeve integrally connected with the valve head on one end and the retaining flange on another end, wherein:
  the elastic material is a plastomer or a thermoplastic elastomer,
  the valve head has a dome shape with a concave exterior side and a convex interior side,
  the connector sleeve is substantially form stable,
  the valve head is connected to an upper end of the connector sleeve by a hinge portion that is U-shaped in cross section,
wherein the wall thickness of the hinge portion is smaller than the wall thickness of the connector sleeve and is staggered at the transition between the connector sleeve and the hinge portion.

The valve according to the invention can be made by injection moulding or injection compression moulding.

The dispensing orifice is formed by through slits through the valve head, preferably forming a cross configuration and intersecting at the centre of the valve head, thus dividing the valve head in four equal sections. The through slits are made in the valve head after injection moulding or injection compression moulding of the valve.

The geometry of the valve according to the invention, and in particular the geometry of the hinge and the valve head in combination with the plastomer or thermoplastic elastomer materials, achieves a valve behaviour that is comparable to the self-closing valves that hitherto have been made of silicone rubber. In particular the geometry-material combination achieves a similar threshold pressure at which the valve opens, and it achieves a similar opening size as was achieved with silicone valves. The circumferential hinge portion has a U-shape in cross section and a wall thickness which is such that upon pressurization from the interior side of the valve, the hinge will initially make an unbending movement like a bellows, due to which the valve head slightly moves axially in the direction towards the exterior, before the dispensing orifice of the valve head opens.

The valve is typically used with a squeeze bottle, which after squeezing and dispensing of substance automatically wants to return to its original shape. The valve is initially closed after dispensing of substance. This creates an underpressure on the interior side of the valve head. The valve according to the invention allows venting air to enter in the container, such that the container can return to its original shape. Thereto the U-shaped hinge portion of the valve bends further inwards such that the valve head moves axially towards the interior, thus sinks further into the connector sleeve and eventually the valve head sections bend whereby the dispensing orifice is opened and venting air is allowed to pass through the valve into the container.

The self-closing valve according to the invention is made of a plastomer or a thermoplastic elastomer, which materials can be recycled with the material of the closure in which the valve is arranged, which generally would be a PP or PE. The plastomer or thermoplastic elastomer are chosen such that they have no migration of agents into foodstuffs, such that they do not compromise the quality and safety of the substance to be dispensed. Furthermore the plastomer grade should be sufficiently heat resistant, because of hot filling of the containers, after which the closure with the valve is placed on the container to close and seal it. By the specific configuration of the valve, these generally stiffer plastomer or thermoplastic elastomer grades can be used.

In view of recycling of materials, preferably a mono material solution is used for the packaging, which solution includes the container, the closure and the self-closing valve. Without wishing to be bound to the current preference, a plastomer would have the preference over a TPE in view of the wish of a mono material solution. However, food-approved plastomers are typically relatively stiff and the most flexible food approved plastomers have a limited heat resistance, which makes them less suitable for a wide applicable valve solution.

Suitable plastomer materials that may be used in combination with the configuration of the valve according to the present invention are some plastomer grades under the name of Queo™ of Borealis, Versify™ of Dow Chemical or Vistamaxx™ of ExxonMobil.

In the following practical embodiments it does not matter whether the chosen material is a suitable plastomer or thermoplastic elastomer (TPE):

In a possible embodiment of the valve according to the invention the wall thickness of the hinge portion is smaller than the wall thickness of the valve head.

In a possible embodiment the hinge portion has a uniform wall thickness, preferably a wall thickness of about 0.2 mm.

In a possible embodiment the U-shaped hinge portion has a convex side which has a radius of curvature of about 0.43 mm.

In a possible embodiment the connector sleeve has a uniform wall thickness.

In a possible embodiment the wall thickness of the connector sleeve is at least twice the wall thickness of the hinge portion.

The choice for a plastomer or a thermoplastic elastomer has influence on the form and dimensions of the valve head.

In an embodiment wherein the valve head is made of a plastomer material, the valve head has a uniform wall thickness. In a practical embodiment the uniform wall thickness may be about 0.25 mm.

Furthermore, in an embodiment wherein the valve head is made of a plastomer material, the valve head has a diameter $D_{vh}$, wherein the concave exterior side of the valve head has a radius of curvature R1, wherein $0.9 \leq D_{vh}/R1 \leq 1.15$, preferably 1.00.

In a practical embodiment of a valve made of plastomer material the concave exterior side has a radius of curvature R1 of 9.5 mm.

In a practical embodiment of a valve made of plastomer material the convex interior side of the valve head has a radius of curvature of 9.75 mm.

In an embodiment wherein the valve head is made of a thermoplastic elastomer material (TPE) the valve head has a wall thickness that tapers towards the centre of the valve head.

In an embodiment wherein the valve head is made of a thermoplastic elastomer material, the wall thickness of the valve head at the centre is preferably ⅔ of the wall thickness at the circumference of the valve head.

In a practical embodiment of the TPE valve the wall thickness at the centre of the valve head is about 0.4 mm. The wall thickness of the valve head at the circumference is thus about 0.6 mm.

Furthermore, in an embodiment wherein the valve head is made of a thermoplastic elastomer, the valve head has a diameter $D_{vh}$, and wherein the concave exterior side of the valve head has a radius of curvature R1, wherein $1.2 \leq D_{vh}/R1 \leq 1.6$, preferably about 1.5.

In a practical embodiment of a valve made of thermoplastic elastomer (TPE) material the concave exterior side has a radius of curvature R1 of 6.5 mm.

In a practical embodiment of a valve made of thermoplastic elastomer (TPE) material the convex interior side of the valve head has a radius of curvature of 7.75 mm.

In general the valve head made of a plastomer material will be "flatter", i.e. less concave and less convex than the valve of made of a thermoplastic elastomer.

Another aspect of the invention relates to a self-closing valve without a connector sleeve. In particular it relates to a self-closing dispensing valve made of an elastic material, said valve comprising a valve head with a dispensing orifice, a circular peripheral retaining flange integrally connected with the valve head, wherein:
- the elastic material is a plastomer or a thermoplastic elastomer,
- the valve head has a dome shape with a concave exterior side and a convex interior side,
- the peripheral retaining flange is substantially form stable,
- the valve head is connected directly to the retaining flange by a hinge portion that is U-shaped in cross section.

In a possible embodiment of the valve according to this aspect of the invention the retaining flange is substantially form stable. However, also embodiments are conceivable wherein the retaining flange is fixed to a rigid support part, such as a support ring, or is fixed in the closure body, e.g. by clamping, crimping, (ultrasonic) welding or adhering, whereby the flange is immobilized. The movement in the valve takes place in the hinge portion or the valve head.

Also the self-closing valve according to this aspect of the invention can be made of a plastomer or a thermoplastic material (TPE). In the following practical embodiments it does not matter whether the chosen material is a suitable plastomer or thermoplastic elastomer (TPE):

In a possible embodiment the wall thickness of the hinge portion is smaller than the wall thickness of the valve head.

In a possible embodiment the hinge portion has a uniform wall thickness, which preferably is 0.2 mm.

In a possible embodiment the U-shaped hinge portion has a convex side which has a radius of curvature of about 0.43 mm.

In an embodiment wherein the valve head is made of a plastomer material, the valve head has a uniform wall thickness. In a practical embodiment the uniform wall thickness may be about 0.25 mm.

Furthermore, in an embodiment wherein the valve head is made of a plastomer material, the valve head has a diameter $D_{vh}$, wherein the concave exterior side of the valve head has a radius of curvature R1, wherein $1.20 \leq D_{vh}/R1 \leq 1.60$, preferably around 1.50.

In any of the embodiments of the self-closing valves described in the above, if the valve has relatively small dimensions, another configuration of through slits than the most common cross configuration may be provided, for example a T-shaped configuration of through slits, which provides a sufficiently large dispensing opening notwithstanding the small size of the valve.

Self-closing valves made of silicone materials are generally made by an injection moulding process. However, the mentioned non-silicone materials, such as certain TPE grades or plastomers, that are compatible with (fatty) food substances, in general have quite a low Melt Flow Index (MFI). This low MFI makes it difficult to process these materials in an injection moulding process, in particular in case the wall thicknesses are as small as is desired for the production of self-closing valves of the present invention, i.e. about 0.2-0.3 mm.

The invention therefore also proposes a method for manufacturing a self-closing dispensing valve as described in the above, wherein the valve is made by injection compression moulding of an elastomer or a plastomer. In the injection compression moulding process an amount of resin (or putty) is injected in a closed mould after which the mould halves are moved towards each other, thereby compressing and distributing the resin in the mould cavity.

However, if the MFI of the material to be moulded allows it, a method for manufacturing a self-closing dispensing valve according to the invention can also include injection moulding the valve from an elastomer material, such as TPE, or a plastomer.

The invention furthermore relates to a dispensing closure including:
- a closure body comprising:
  - a deck in which a dispensing passage is formed,
  - a skirt depending from the deck and adapted to be coupled with a container neck and defining an interior space of the closure,
  - a valve seating portion formed in the interior space in line with the dispensing passage, and
- a self-closing valve as set out in the foregoing, arranged and secured in the valve seating portion of the closure body.

The closure body is produced by injection moulding of a suitable thermoplastic material, such as PP or PE. The self-closing valve is produced separately and placed in the valve seating portion of the closure body after which it is fixed in the closure body by some suitable means, e.g. clamping, crimping, welding or adhering.

The invention will be further elucidated in the following detailed description with reference to the drawings.

BRIEF DESCRIPTION OF THE DRAWINGS

FIGS. 8a-8e show in another view in perspective a $⅛^{th}$ section of the valve of FIG. 1 in the same states as in FIG. 7a-7e, FIG. 9 shows a top elevational view of the valve of FIG. 1 in the states corresponding to FIG. 7a-7d.

DETAILED DESCRIPTION OF THE INVENTION

Figure 1:
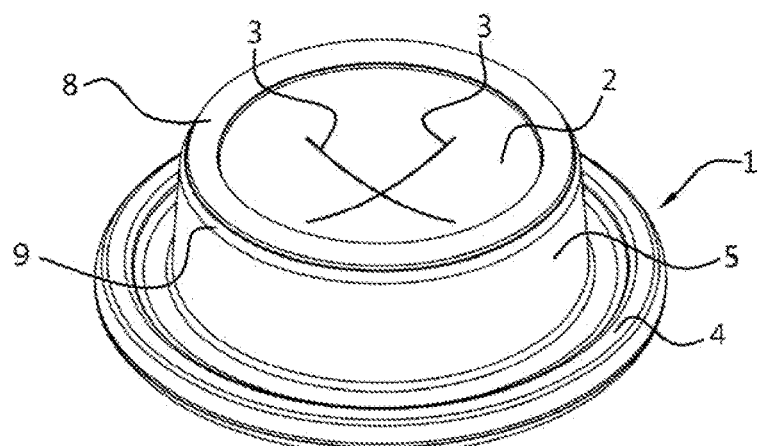
FIG. 1 shows a view in perspective of an embodiment of a self-closing valve according to the invention made of a plastomer material.
Figure 2:
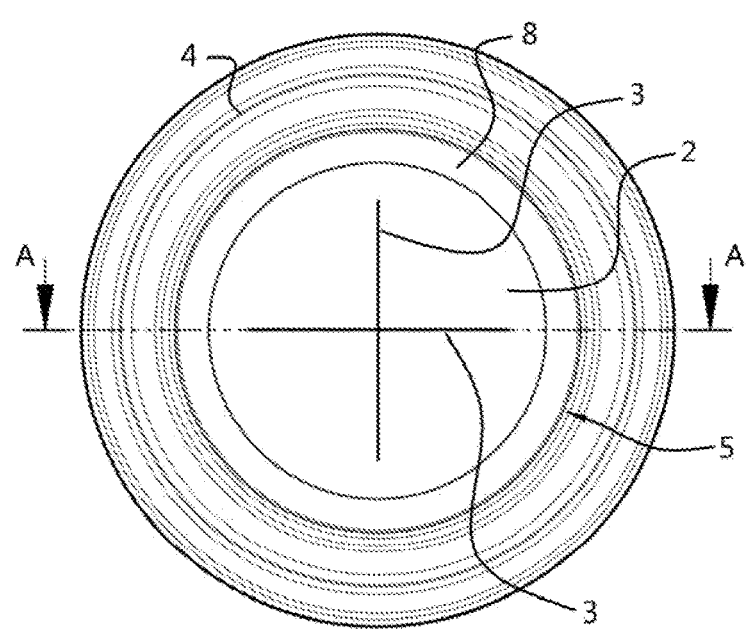
FIG. 2 shows a top elevational view of the valve of FIG. 1.
Figure 3:
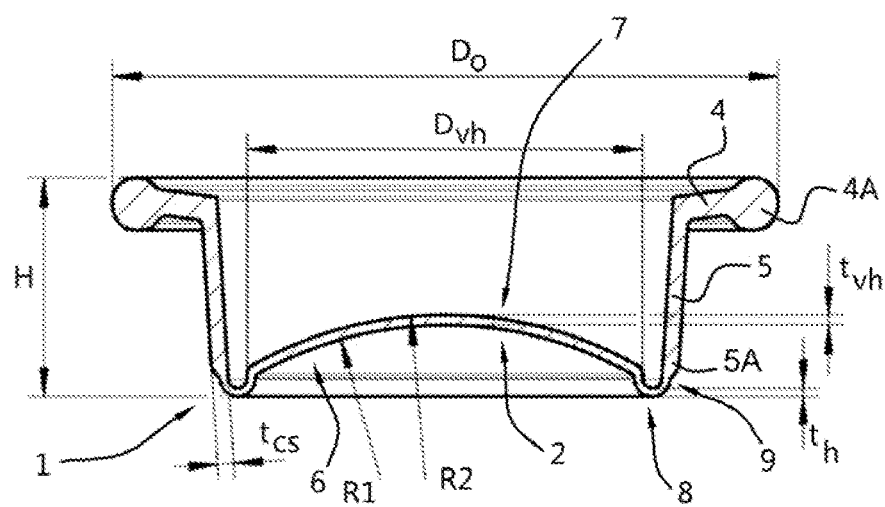
FIG. 3 shows a cross section of the valve according to the line A-A indicated in FIG. 2.

FIGS. 1-3 show an embodiment of a self-closing valve 1 according to the invention. The valve 1 is made by injection moulding or injection compression moulding of an elastic material, in particular a plastomer.

The valve 1 comprises a valve head 2 with a dispensing orifice. The dispensing orifice is formed by two intersecting through slits 3. The through slits 3 intersect in the centre of the valve head 2. The valve furthermore comprises a circular peripheral retaining flange 4 spaced apart from the valve head 2 in an axial direction. In the embodiment shown the flange comprises a thickened outer portion 4A. A connector sleeve 5 is integrally connected with the valve head 2 on one end and the retaining flange 4 on another end.

To get an idea of the overall dimensions, a practical embodiment of the valve 1 has an outer diameter $D_o$ of about 16.4 mm, and a height H of 5.4 mm. The valve head 2 has a diameter $D_{vh}$ of about 9.7 mm.

The valve head 2 of the valve 1 has a dome shape with a concave exterior side 6 and a convex interior side 7 as can be best seen in FIG. 3.

Figure 15:
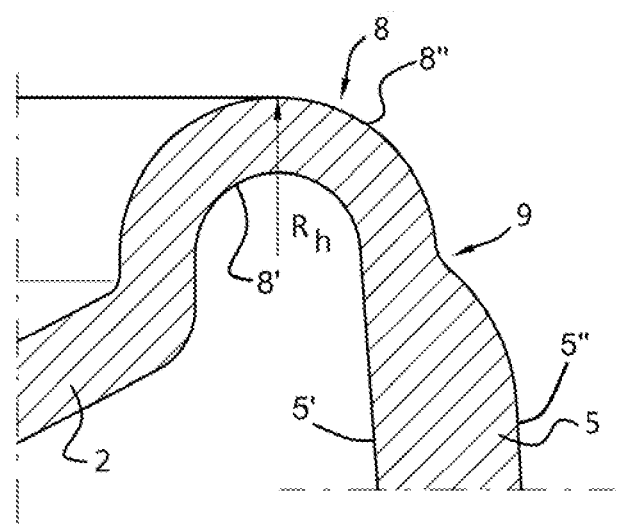
FIG. 15 shows in detail a cross section of a hinge portion of the valve of FIG. 1.

The valve head 2 is connected to an upper end 5A of the connector sleeve 5 by a hinge portion 8 that is U-shaped in cross section, as can be best seen in FIG. 3 and in detail in FIG. 15. As shown in FIG. 15, the connector sleeve 5 has an interior side 5' and an exterior side 5", and the hinge portion 8 has an interior side 8' and an exterior side 8". The wall thickness $t_h$ of the hinge portion 8 is smaller than the wall thickness $t_{cs}$ of the connector sleeve 5 and is staggered at the transition. The staggered transition is indicated by reference number 9 between the connector sleeve 5 and the hinge portion 8.

The connector sleeve 5 in this embodiment is slightly tapering from the retaining flange 4 towards the valve head 2, thus almost cylindrical. The small inclination of the connector sleeve 5 with respect to the centre axis of the valve 1 facilitates ejection of the valve 1 out of the mould. However, the connector sleeve may also have another shape for example partly cylindrical and partly tapering from the retaining flange towards the valve head.

The wall thickness of the hinge portion $t_h$ is smaller than the wall thickness $t_{vh}$ of the valve head 2.

The hinge portion 8 has a uniform wall thickness $t_h$, which in a preferred practical embodiment is 0.2 mm.

The hinge portion has a convex side which has a radius of curvature $R_h$ (cf. FIG. 15) of about 0.43 mm.

The connector sleeve 5 has a uniform wall thickness $t_{cs}$. The wall thickness $t_{cs}$ of the connector sleeve 5 is at least twice the wall thickness $t_h$ of the hinge portion 8. The wall thickness $t_{cs}$ of the connector sleeve 5 is in a practical embodiment 0.4 mm. The connector sleeve 5 having this wall thickness and made of plastomer material is form stable.

The valve head 2 of the valve 1 has a uniform wall thickness, which is preferably about 0.25 mm.

The valve head 2 has a diameter $D_{vh}$, and the concave exterior side 6 of the valve head 2 has a radius of curvature R1, wherein $1.00 \leq D_{vh}/R1 \leq 1.15$.

In the practical embodiment shown the concave exterior side has a radius of curvature R1 of 9.5 mm and the convex interior side 7 of the valve head 2 has a radius of curvature R2 of 9.75 mm.

Figure 10:
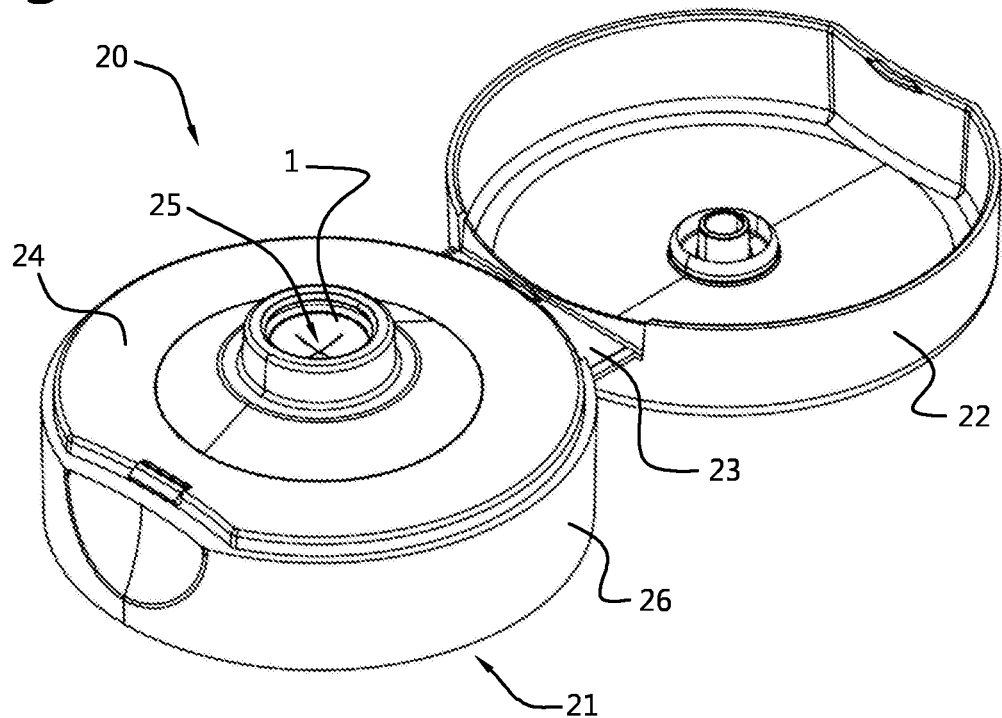
FIG. 10 shows a view in perspective of a dispensing closure including the valve of FIG. 1.
Figure 11:
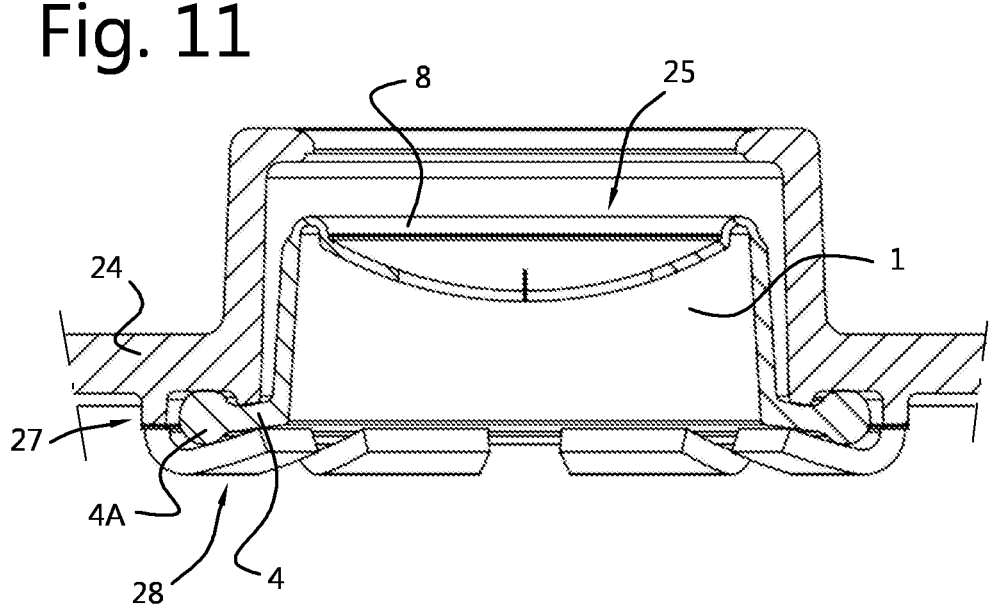
FIG. 11 shows a detail of the closure of FIG. 10 in cross section.

FIGS. 10 and 11 illustrate how the valve 1 is arranged in a closure 20 for a squeeze container, e.g. a bottle containing an edible sauce like ketchup, mayonnaise etc. The closure 20 shown in FIG. 10 is a so called flip top closure comprising a closure body 21 and a lid 22, which is integrally connected to the closure body 21 by a living hinge 23. The closure body 21 comprises a deck 24 in which a dispensing passage 25 is formed. Furthermore the closure body comprises a skirt 26 depending from the deck 24 and defining an interior space of the closure 20. A valve seating portion 27 is formed in the interior space in line with the dispensing passage 25 as is shown in the cross section of FIG. 11. In this particular embodiment the valve seating portion includes foldable lips 28 which are folded over the retaining flange 4 of the valve 1 after the valve is placed in the valve seating portion 27, so as to retain the valve 1 in the closure body 21. This can for example be done by ultrasonic welding which provides the energy to plastically deform the foldable lips 28.

In FIGS. 7a-7e and 8a-8e is illustrated how the valve 1 works by showing the deformation of a ⅛ section of the valve 1. The slit 3 is on the far side. FIGS. 7a and 8a show the rest state of the valve 1. When a pressure is applied on the valve 1 from the interior side, typically because the container on which the closure 20 is mounted is squeezed, the hinge portion 8 of the valve unbends to some extent as is visible by the comparison of the FIGS. 7a and 8a with FIGS. 7b and 8b, respectively. As can be seen in FIGS. 7b and 8b the valve head 2 is moved in axial direction in a direction away from the retaining flange 4, in the FIGS. 7b and 8b upwards. As can be seen the tip 10 of the valve head flaps defined by the slits 3 is still situated along the centre axis CA of the valve 1 and thus the valve is still closed. Upon further increase of the pressure on the interior will pass a threshold pressure and the valve flaps will start to bend and the slits 3 are opened. In the FIGS. 7c and 8c this is illustrated. Also in FIGS. 9b and 9c this is shown from above. In the embodiment of the valve as described and shown in the FIGS. 1-3, this opening of the valve orifice is instantaneous a relatively large opening as is shown in FIG. 9c. Upon further increase of the pressure the valve will more gradually open further to the state that is illustrated in FIGS. 7d, 8d and 9d.

Figure 12:
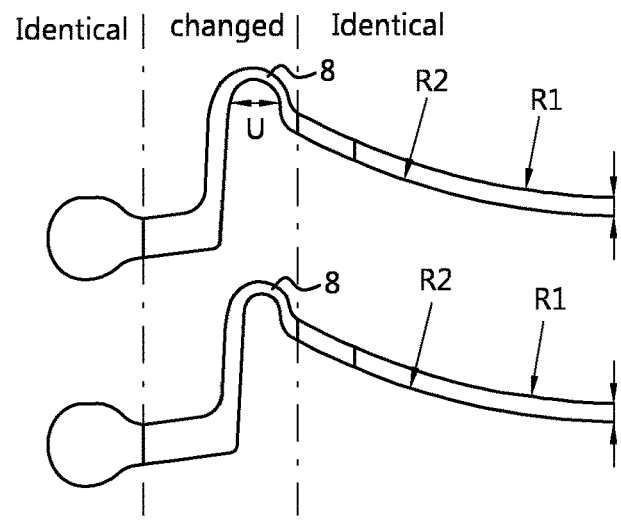
FIG. 12 illustrates the change of the width of a hinge portion of the valve of FIG. 1.
Figure 13:
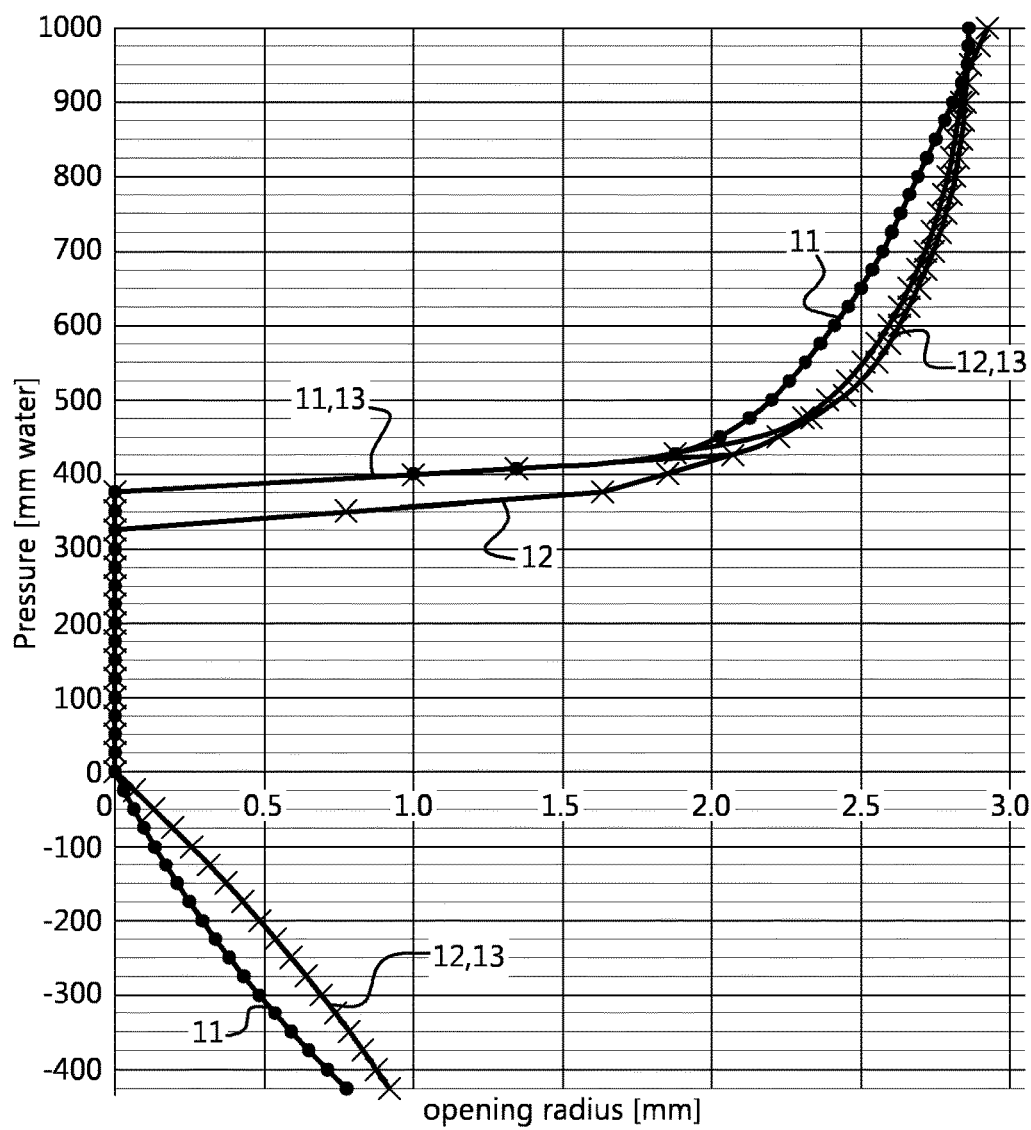
FIG. 13 shows an opening radius vs. pressure curve of two valves of type of the valve of FIG. 1 and a reference valve made of silicone rubber.

In FIG. 13 a plot is shown which also illustrates the behaviour of the valve 1 compared with a similar self-closing valve made of a silicone rubber. On the vertical axis the pressure is indicated in mm H₂O, on the horizontal axis the opening radius of the valve orifice is indicted in mm. The plot with the dots is indicated with reference numeral 11 and is representing the behaviour of the silicone valve, which serves as a reference for the valves 1 made of a plastomer. The plot with the X indicated with reference numeral 12 is representing a first embodiment of the valve 1. The plot with the X indicated with reference numeral 13 is representing a second embodiment of the valve 1, wherein the U-shape of the valve 1 is wider than for the first embodiment. This difference is illustrated in FIG. 12, wherein the first embodiment (plot 12) is the lower valve and the second embodiment (plot 13) is the upper valve in FIG. 12. The width U (cf. FIG. 12) is thus larger in the second embodiment than in the first embodiment.

As is derivable from the plot, the pressure can be increased up to 325 and 375 mm H₂O, respectively before the valve 1 starts to open. The relatively horizontal development of the graph shows that the dispensing orifice 15 (cf. FIGS. 9b-9d) opens quickly to an opening radius of about 2 mm. Upon further increase of the pressure the increase of the valve radius follows a more gradual curve, in practice up to about 2.5 mm.

As can be seen the narrower U-shape opens at a lower pressure (i.e. 325 mm H₂O) than the reference valve made of silicone rubber. By increasing the width U of the U-shaped hinge portion 8 the plot can be raised to the pressure level (i.e. 375 mm H₂O) at which the reference valve opens.

As mentioned the valve 1 is typically used with a squeeze bottle, which after squeezing and dispensing of substance automatically wants to return to its original shape. The valve 1 is initially closed after dispensing of substance. This creates an underpressure on the interior side of the valve head 2. The valve 1 allows venting air to enter in the container, such that the container can return to its original shape. Thereto the U-shaped hinge portion 8 of the valve 1 bends further inwards such that the valve head 2 moves axially towards the interior, thus sinks further into the connector sleeve and eventually the valve head sections bend whereby the dispensing orifice is opened and venting air is allowed to pass through the valve into the container. This state is illustrated in FIGS. 7e and 8e. From the plots 12, 13 in FIG. 13 one can see that the valve 1 opens following a linear curve to a maximum radius of the orifice of about 1 mm at a negative pressure of 475 mm H₂O.

Figure 4:
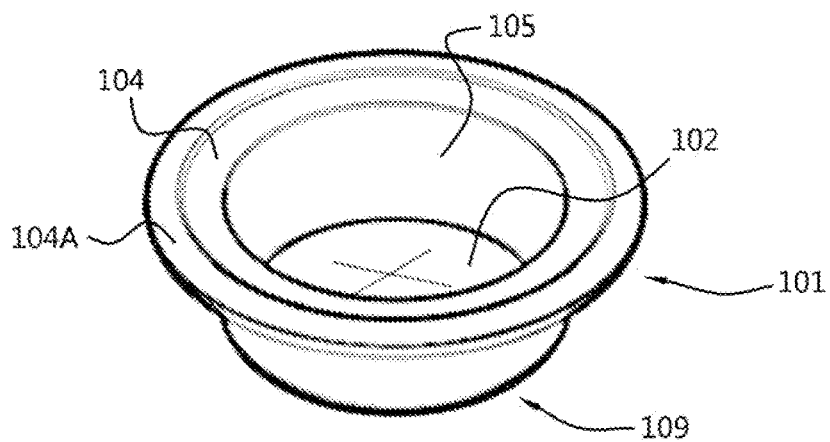
FIG. 4 shows a view in perspective of an embodiment of a self-closing valve according to the invention made of a thermoplastic elastomer (TPE) material.
Figure 5:
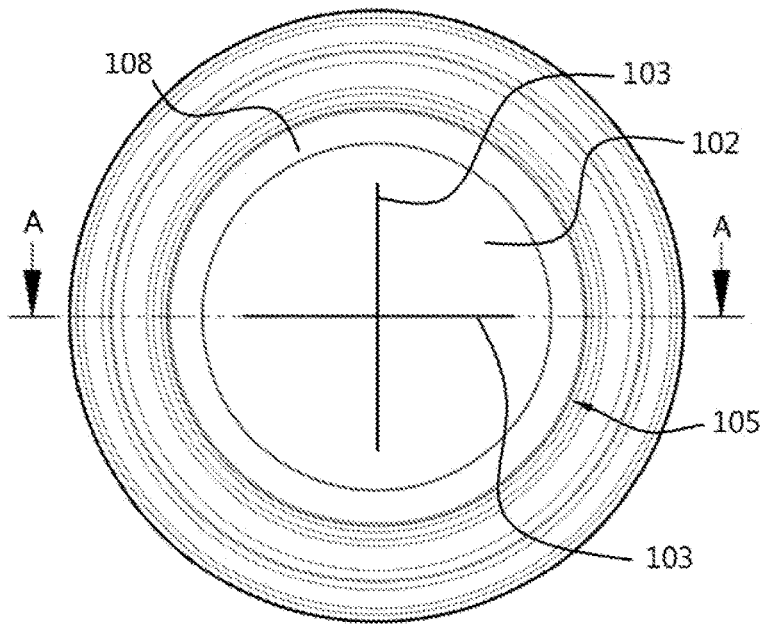
FIG. 5 shows a top elevational view of the valve of FIG. 4.
Figure 6:
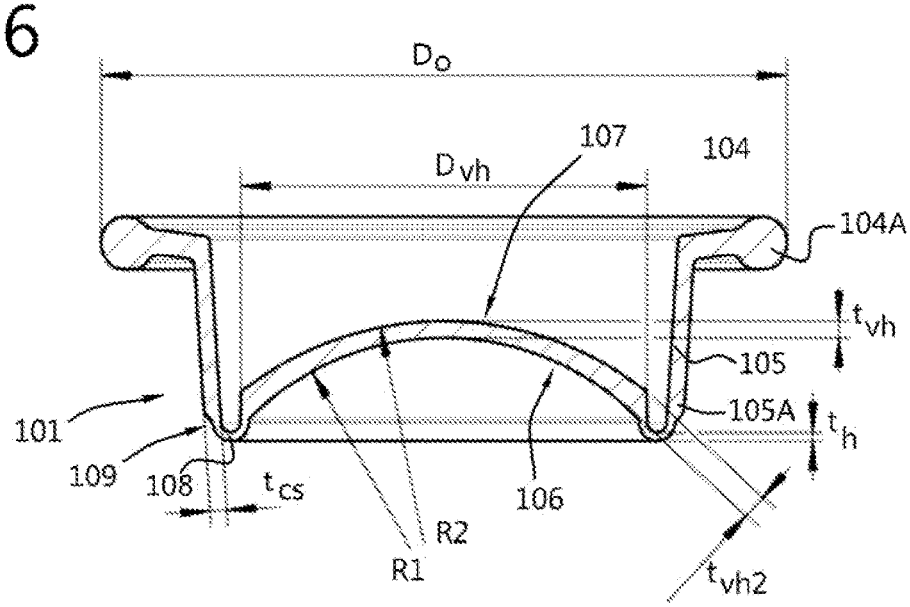
FIG. 6 shows a cross section of the valve according to the line A-A indicated in FIG. 5, FIGS. 7a-7e show in a view in perspective a $⅛^{th}$ section of the valve of FIG. 1 in different states.

In FIGS. 4-6 another embodiment of a self-closing valve according to the invention is shown This valve indicated by 101 is made by injection moulding or injection compression moulding of a thermoplastic elastomer TPE.

The valve 101 comprises a valve head 102 with a dispensing orifice. The dispensing orifice is formed by two intersecting through slits 103. The through slits 103 intersect in the centre of the valve head 102. The valve 101 furthermore comprises a circular peripheral retaining flange 104 spaced apart from the valve head 102 in an axial direction. In the embodiment shown in FIGS. 4-6 the flange 104 comprises a thickened outer portion 104A. A connector sleeve 105 is integrally connected with the valve head 102 on one end and the retaining flange 104 on another end.

To get an idea of the overall dimensions, a practical embodiment of the valve 101 has an outer diameter $D_o$ of about 16.4 mm, and a height H of 5.4 mm. The valve head 102 has a diameter $D_{vh}$ of about 9.7 mm. This is thus the same as the valve 1 of FIG. 1 which is made of a plastomer.

The valve head 102 of the valve 101 has a dome shape with a concave exterior side 106 and a convex interior side 107 as can be best seen in FIG. 6.

The valve head 102 is connected to an upper end 105A of the connector sleeve 105 by a hinge portion 108 that is U-shaped in cross section, as can be best seen in FIG. 6 and in detail in FIG. 15. The wall thickness $t_h$ of the hinge portion 108 is smaller than the wall thickness $t_{cs}$ of the connector sleeve 105 and is staggered at the transition. The staggered transition is indicated by reference number 109 between the connector sleeve 105 and the hinge portion 108. This part of the valve 101 is also the same as of the valve 1. In a practical embodiment it may thus have the same dimensions:

The wall thickness of the hinge portion $t_h$ is smaller than the wall thickness $t_{vh}$ of the valve head 102.

The hinge portion 108 has a uniform wall thickness $t_h$, which in a preferred practical embodiment is 0.2 mm.

The hinge portion has a convex side which has a radius of curvature $R_h$ (cf. FIG. 15) of about 0.43 mm.

The connector sleeve 105 has a uniform wall thickness $t_{cs}$. The wall thickness $t_{cs}$ of the connector sleeve 105 is at least twice the wall thickness $t_h$ of the hinge portion 108. The wall thickness $t_{cs}$ of the connector sleeve 105 is in a practical embodiment 0.4 mm. The connector sleeve 105 having this wall thickness and made of a thermoplastic elastomer (TPE) material is form stable.

The connector sleeve 105 in this embodiment is slightly tapering from the retaining flange 104 to the valve head 102, thus almost cylindrical. The small inclination of the connector sleeve 5 with respect to the centre axis of the valve 1 facilitates ejection of the valve 1 out of the mould.

The valve 101 made of TPE is formed differently from the valve 1 made of plastomer when it comes to the shape of the valve head.

Unlike the valve 1 the valve 101 does not have a valve head with a constant wall thickness, but the valve head 102 has a wall thickness $t_{vh}$ that tapers towards the centre of the valve head. In other words the valve head is thinnest at the centre and its wall thickness increases when going radially outwardly.

In a practically good working embodiment the wall thickness $t_{vh1}$ of the valve head 102 at the centre is ⅔ of the wall thickness $t_{vh2}$ at the circumference of the valve head 102. In a practical embodiment the wall thickness $t_{vh1}$ at the centre of the valve head 102 is about 0.4 mm.

The valve head 102 has a diameter D1, and wherein the concave exterior side 106 of the valve head 106 has a radius of curvature R1, wherein $1.2 \leq D_{vh}/R1 \leq 1.6$, preferably about 1.5.

In a practical embodiment the concave exterior side 106 has a radius of curvature R1 of 6.5 mm and the convex interior side 107 of the valve head 101 has a radius of curvature of 7.75 mm. The valve head 102 of the valve 101 has thus a more convex and more concave shape than the valve head 2 of the valve 1; in other words the valve head 2 is "flatter" than the valve head 102.

Figure 14:
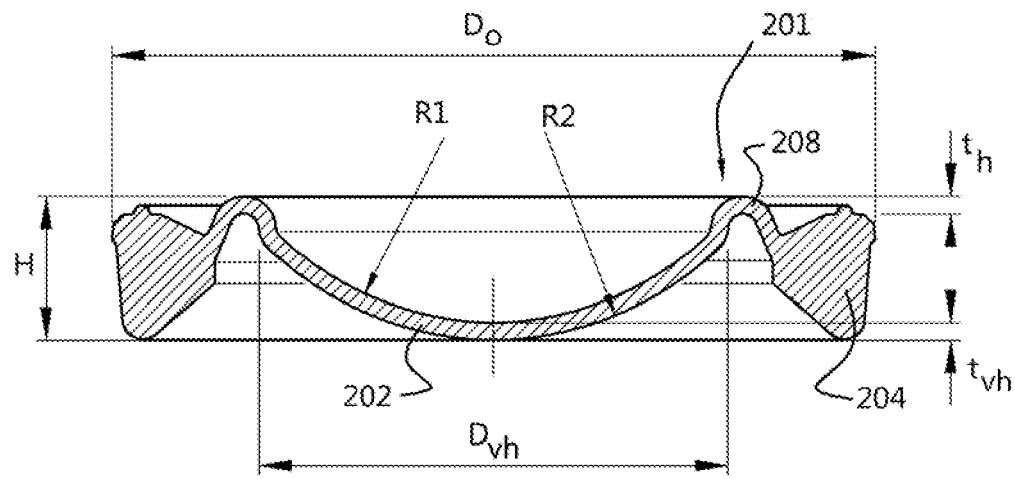
FIG. 14 shows a cross sectional view of another possible self-closing valve according to the invention.

In FIG. 14 a self-closing dispensing valve 201 according to a further aspect of the invention is shown. This dispensing valve 201 is made of an elastic material, in particular of a TPE. The valve 201 comprises a valve head 202 with a dispensing orifice, and a circular peripheral retaining flange 204 integrally connected with the valve head 202. A difference with the valves 1 and 101 described in the above is thus that a connector sleeve is omitted.

The valve head 201 has a dome shape with a concave exterior side 206 and a convex interior side 207. The peripheral retaining flange 204 is substantially form stable. The valve head 202 is connected directly to the retaining flange 204 by a hinge portion 208 that is U-shaped in cross section.

In this embodiment the retaining flange is a thickened ring which is substantially form stable. However, it is also conceivable to make a more flexible retaining flange which is attached, for example welded to a more rigid plastic ring.

To get an idea of the overall dimensions, a practical embodiment of the valve 201 has an outer diameter $D_o$ of about 10.3 mm, and a height H of 2.0 mm. The valve head 202 has a diameter $D_{vh}$ of about 6.2 mm.

In the valve 201 the wall thickness $t_h$ of the hinge portion 208 is smaller than the wall thickness $t_{vh}$ of the valve head 202.

The hinge portion 208 has a uniform wall thickness, which in a practical embodiment as is shown here is 0.2 mm.

The U-shaped hinge portion 208 has a convex side which has a radius of curvature of about 0.43 mm.

The valve head has a uniform wall thickness, which in a practical embodiment is about 0.25 mm.

The concave exterior side of the valve head 202 has a radius of curvature R1. The form of the valve head made of a plastomer is such that $1.2 \leq D_{vh}/R1 \leq 1.6$, preferably around 1.5.

It is noted that the valve 201 described in the above has relatively small dimensions (outer diameter $D_o$=10.3 mm etc). In such a small valve the use of a plastomer is very difficult due to the relatively high stiffness of food-approved plastomers. The wall thicknesses would become too small to process when using a suitable plastomer for the small valve 201, in order to achieve a valve with a sufficiently large dispensing opening. Therefore the smaller valve 201 is made in a suitable TPE grade. However, if the valve 201 is made larger, thus with a larger outer diameter etc., the use of a suitable plastomer is conceivable.

The dispensing orifice of the valve 201 is formed by one or more through slits. For a small valve (e.g. Do=10.3 mm), which is described in the foregoing, two, preferably perpendicular, through slits form a T-configuration such that a sufficiently large dispensing opening can be obtained in the small valve. For valves 201 with a larger dimension a dispensing orifice defined by through slits in a more common cross-configuration (see FIG. 2 for an example) may be provided.

The invention claimed is:

1. A self-closing dispensing valve made of an elastic material, said valve comprising a valve head with a dispensing orifice, a circular peripheral retaining flange spaced apart from the valve head in an axial direction, and a connector sleeve integrally connected with the valve head on one end and the retaining flange on another end, wherein:

the elastic material is a plastomer, the valve head has a dome shape with a concave exterior side and a convex interior side, the connector sleeve is substantially form stable and has a wall thickness, and furthermore has an exterior side and an interior side, the valve head is connected to an upper end of the connector sleeve by a hinge portion that is U-shaped in cross section, and the hinge portion has an exterior side and an interior side, wherein the hinge portion has a wall thickness which is smaller than the wall thickness of the connector sleeve, and wherein at a transition between the connector sleeve and the hinge portion, the interior side of the connector sleeve and the interior side of the hinge portion are flush with each other, and the exterior side of the connector sleeve and the exterior side of the hinge portion have a staggered transition.

2. The self-closing valve according to claim 1, wherein the wall thickness of the hinge portion is smaller than the wall thickness of the valve head.

3. The self-closing valve according to claim 1, wherein the hinge has a uniform wall thickness.

4. The self-closing valve according to claim 3, wherein the wall thickness of the hinge portion is 0.2 mm.

5. The self-closing valve according to any claim 1, wherein the U-shaped hinge portion has a convex side which has a radius of curvature of about 0.43 mm.

6. The self-closing valve according to claim 1, wherein the connector sleeve has a uniform wall thickness.

7. The self-closing valve according to claim 1, wherein the wall thickness of the connector sleeve is at least twice the wall thickness of the hinge portion.

8. The self-closing valve according to claim 1, wherein the valve head has a uniform wall thickness.

9. The self-closing valve according to claim 8, wherein the wall thickness of the valve head is about 0.25 mm.

10. The self-closing valve according to claim 1, wherein the valve head has a diameter Dvh, and wherein the concave exterior side of the valve head has a radius of curvature R1, wherein $0.90 \leq Dvh/R1 \leq 1.15$.

11. The self-closing valve according to claim 1, wherein the concave exterior side has a radius of curvature R1 of 9.5 mm.

12. The self-closing valve according to claim 1, wherein the convex interior side of the valve head has a radius of curvature of 9.75 mm.

13. The self-closing valve according to claim 1, wherein the connector sleeve is substantially cylindrical.

14. The self-closing valve according to claim 1, wherein the connector sleeve is at least partly tapering from the retaining flange towards the valve head.

15. The self-closing closing valve according to claim 1, wherein the dispensing orifice is defined by at least one through slit in the valve head.

16. A self-closing dispensing valve made of an elastic material, said valve comprising a valve head with a dispensing orifice, a circular peripheral retaining flange spaced apart from the valve head in an axial direction, and a connector sleeve integrally connected with the valve head on one end and the retaining flange on another end, wherein the elastic material is a thermoplastic elastomer, wherein the valve head has a dome shape with a concave exterior side and a convex interior side, wherein the connector sleeve is substantially form stable and has a wall thickness, and furthermore has an exterior side and an interior side, wherein the valve head is connected to an upper end of the connector sleeve by a hinge portion that is U-shaped in cross section, and the hinge portion has an exterior side and an interior side, wherein the hinge portion has a wall thickness which is smaller than the wall thickness of the connector sleeve, and wherein at a transition between the connector sleeve and the hinge portion, the interior side of the connector sleeve and the interior side of the hinge portion are flush with each other, and the exterior side of the connector sleeve and the exterior side of the hinge portion have a staggered transition.

17. The self-closing valve according to claim 16, wherein the wall thickness of the hinge portion is smaller than the wall thickness of the valve head.

18. The self-closing valve according to claim 16, wherein the hinge has a uniform wall thickness.

19. The self-closing valve according to claim 16, wherein the connector sleeve has a uniform wall thickness.

20. The self-closing valve according to claim 16, wherein the wall thickness of the connector sleeve is at least twice the wall thickness of the hinge portion.

* * * * *